US012549095B2

United States Patent
Hung

(10) Patent No.: US 12,549,095 B2
(45) Date of Patent: Feb. 10, 2026

(54) COMMON-MODE NOISE CANCELLATION CIRCUIT AND SWITCHING POWER CONVERTER WITH PASSIVE COMMON-MODE NOISE CANCELLATION FUNCTION

(71) Applicant: ASIAN POWER DEVICES INC., Taoyuan (TW)

(72) Inventor: Tsung-Liang Hung, Taoyuan (TW)

(73) Assignee: ASIAN POWER DEVICES INC., Taoyuan (TW)

( * ) Notice: Subject to any disclaimer, the term of this patent is extended or adjusted under 35 U.S.C. 154(b) by 275 days.

(21) Appl. No.: 18/353,952

(22) Filed: Jul. 18, 2023

(65) Prior Publication Data
US 2024/0396432 A1    Nov. 28, 2024

(30) Foreign Application Priority Data
May 22, 2023 (TW) ................................ 112118918

(51) Int. Cl.
  *H02M 1/44*   (2007.01)
  *H02M 3/335*  (2006.01)
(52) U.S. Cl.
  CPC ............. *H02M 1/44* (2013.01); *H02M 3/335* (2013.01)
(58) Field of Classification Search
  CPC .................................. H02M 1/44; H02M 3/335
  See application file for complete search history.

(56) References Cited

U.S. PATENT DOCUMENTS

| | | | |
|---|---|---|---|
| 6,208,098 B1 * | 3/2001 | Kume | H02M 1/126 318/803 |
| 12,323,048 B2 * | 6/2025 | Hung | H02M 1/0064 |
| 2006/0220972 A1 * | 10/2006 | Saitoh | H03H 7/427 343/722 |
| 2012/0063173 A1 * | 3/2012 | Fu | H02M 3/28 363/21.02 |
| 2017/0047848 A1 | 2/2017 | Huang et al. | |

(Continued)

FOREIGN PATENT DOCUMENTS

| | | |
|---|---|---|
| CN | 107528466 A | 12/2017 |
| CN | 207652310 U | 7/2018 |
| CN | 214799285 U | 11/2021 |

OTHER PUBLICATIONS

Office Action dated Nov. 23, 2023 of the corresponding Taiwan patent application No. 112118918.

(Continued)

*Primary Examiner* — Fred E Finch, III
(74) *Attorney, Agent, or Firm* — MUNCY, GEISSLER, OLDS & LOWE, P.C.

(57) ABSTRACT

A common-mode noise cancellation circuit includes a capacitor and an inductor. The inductor has a three coupled winding, including a first coupled winding, a second coupled winding, and a third coupled winding. An input end of the first coupled winding and an input end of the second coupled winding are respectively coupled to two ends of an input power source. An input end of the third coupled winding is coupled to the input end of the second coupled winding, and an output end of the third coupled winding is coupled to the capacitor. An output end of the first coupled winding and an output end of the second coupled winding are respectively coupled to two input ends of a power conversion stage.

15 Claims, 3 Drawing Sheets

(56) References Cited

U.S. PATENT DOCUMENTS

| | | | |
|---|---|---|---|
| 2017/0257033 A1* | 9/2017 | Liu | H02M 3/01 |
| 2021/0288575 A1* | 9/2021 | Liu | H02M 1/126 |
| 2023/0308069 A1* | 9/2023 | Yamaguchi | H02M 1/0064 |
| 2024/0171088 A1* | 5/2024 | Jiao | H02M 7/4833 |

OTHER PUBLICATIONS

Office Action dated Feb. 29, 2024 of the corresponding Taiwan patent application No. 112118918.

* cited by examiner

COMMON-MODE NOISE CANCELLATION CIRCUIT AND SWITCHING POWER CONVERTER WITH PASSIVE COMMON-MODE NOISE CANCELLATION FUNCTION

BACKGROUND

Technical Field

The present disclosure relates to a common-mode noise cancellation circuit and a switching power converter, and more particularly to a common-mode noise cancellation circuit and a switching power converter with a passive common-mode noise cancellation function.

Description of Related Art

The statements in this section merely provide background information related to the present disclosure and do not necessarily constitute prior art.

In the structure of the related-art switching power converter, there is typically a common-mode noise filter at its input end, consisting of a common-mode inductor and Y capacitors (including a capacitor C1 and a capacitor C2). This common-mode noise filter usually has one to three sets. Due to the frequency range of conduction electromagnetic interference (EMI) ranging from 150 kHz to 30 MHz, and the fact that filters typically have limited response bandwidth, multiple sets of filters are required.

The performance of a filter is directly related to the attenuation performance within the bandwidth. In order to achieve better noise attenuation, traditional methods use common-mode inductors with two windings $N_1$, $N_2$, which require higher inductance, and therefore they have larger size and higher cost. Moreover, a high-inductance inductor typically requires a greater number of wire windings, resulting in increased efficiency losses and heat generation. Please refer to FIG. 1, which shows a circuit diagram of a related-art switching power converter. From FIG. 1, it is evident that the common-mode current $i_{cm}$ typically flows through the secondary side and is transmitted to the ground FG, and then returns to a line impedance stabilization network (LISN) via the ground FG. Subsequently, the common-mode current $i_{cm}$ is detected by the EMI receiver.

Therefore, an important subject studied by inventors of the present disclosure is the design of a common-mode noise cancellation circuit and a switching power converter with a passive common-mode noise cancellation function to solve the problems and technical bottlenecks associated with existing technologies.

SUMMARY

An objective of the present disclosure is to provide a common-mode noise cancellation circuit. The common-mode noise cancellation circuit includes a capacitor and an inductor. The inductor includes three coupled windings involving a first coupled winding, a second coupled winding, and a third coupled winding. An input end of the first coupled winding and an input end of the second coupled winding are respectively coupled to two ends of an input power source. An input end of the third coupled winding is coupled to the input end of the second coupled winding, and an output end of the third coupled winding is coupled to the capacitor. An output end of the first coupled winding and an output end of the second coupled winding are respectively coupled to two input ends of a power conversion stage.

In one embodiment, a polarity of the input end of the first coupled winding is the same as a polarity of the input end of the second coupled winding and is the same as a polarity of the input end of the third coupled winding.

In one embodiment, the third coupled winding generates a reverse current equivalent to a magnitude of a common-mode noise current.

In one embodiment, the common-mode noise cancellation circuit has a function of a current transformer.

In one embodiment, the common-mode noise cancellation circuit further has a function of a signal amplifier and/or a function of a signal inverter.

Another objective of the present disclosure is to provide a switching power converter with a passive common-mode noise cancellation function. The switching power converter includes a transformer and a primary-side circuit. The transformer includes a primary side and a secondary side. The primary-side circuit is coupled to the primary side, and the primary-side circuit includes a line impedance stabilization network, a common-mode noise cancellation circuit, and a voltage conversion circuit. The line impedance stabilization network receives an input power source. The common-mode noise cancellation circuit includes a capacitor and an inductor. The inductor includes three coupled windings including a first coupled winding, a second coupled winding, and a third coupled winding. An input end of the first coupled winding and an input end of the second coupled winding are respectively coupled to two output ends of the line impedance stabilization network. An input end of the third coupled winding is coupled to the input end of the second coupled winding, and an output end of the third coupled winding is coupled to the capacitor. The voltage conversion circuit is coupled between an output end of the first coupled winding, an output end of the second coupled winding and the primary side.

In one embodiment, based on the input power source being an AC power source, the switching power converter further includes a bridge rectifier. The bridge rectifier is coupled between the common-mode noise cancellation circuit and the voltage conversion circuit, and two input ends of the bridge rectifier are respectively coupled to the output end of the first coupled winding and the output end of the second coupled winding.

In one embodiment, a polarity of the input end of the first coupled winding is the same as a polarity of the input end of the second coupled winding and is the same as a polarity of the input end of the third coupled winding.

In one embodiment, the third coupled winding generates a reverse current equivalent to a magnitude of a common-mode noise current.

In one embodiment, the common-mode noise cancellation circuit has a function of a current transformer.

In one embodiment, the common-mode noise cancellation circuit further has a function of a signal amplifier and/or a function of a signal inverter.

In one embodiment, the primary-side circuit further includes a protection circuit. The protection circuit is coupled to the primary side of the transformer.

In one embodiment, the protection circuit is a clamping circuit or a snubber circuit. In one embodiment, the bridge rectifier is an active bridge rectifier or a passive bridge rectifier.

In one embodiment, the voltage conversion circuit is a boost circuit, a buck circuit, or a buck-boost circuit.

Accordingly, the common-mode noise cancellation circuit and the switching power converter with a passive common-mode noise cancellation function have the following characteristics and advantages: 1. A structure of the common-mode noise cancellation circuit composed entirely of passive components, as evident from experimental results, clearly shows that the same components, when using common-mode noise cancellation techniques, can achieve better common-mode noise cancellation performance; 2. Compared to the traditional passive LC filters under the same number of components, the present disclosure only requires the addition of the third coupled winding. However, since the third coupled winding carries a smaller current, it can be made using finer enameled wire without significantly increasing the size and cost of the coupled inductor; 3. Using a small-size common-mode choke (CM choke) achieves higher filtering performance, and the reduced number of windings and compact size of the CM choke contribute to efficient and compact design; 4. Addition of the third coupled winding using parallel winding method with the existing windings, and the third coupled winding has a smaller wire diameter (lower current), which does not significantly increase the cost; 5. Reliability is higher in designs that are fully composed of passive components.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
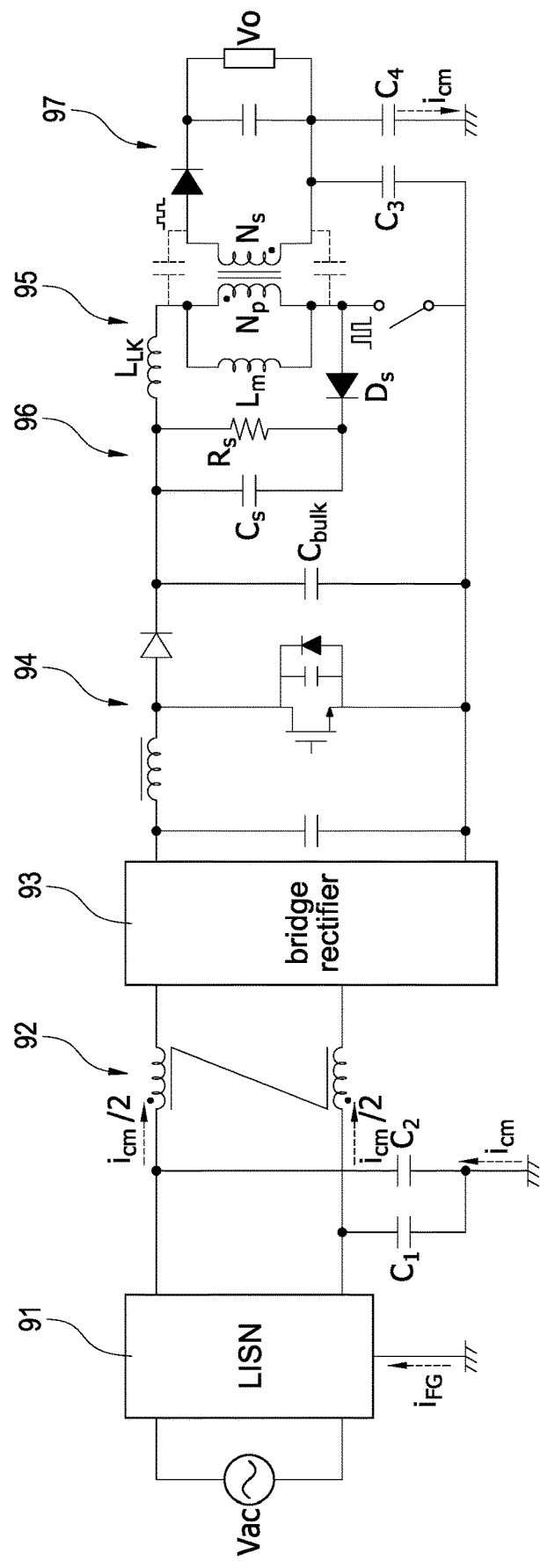
FIG. 1 is a circuit diagram of a related-art switching power converter.

Reference will now be made to the drawing figures to describe the present disclosure in detail. It will be understood that the drawing figures and exemplified embodiments of present disclosure are not limited to the details thereof.

Figure 2:
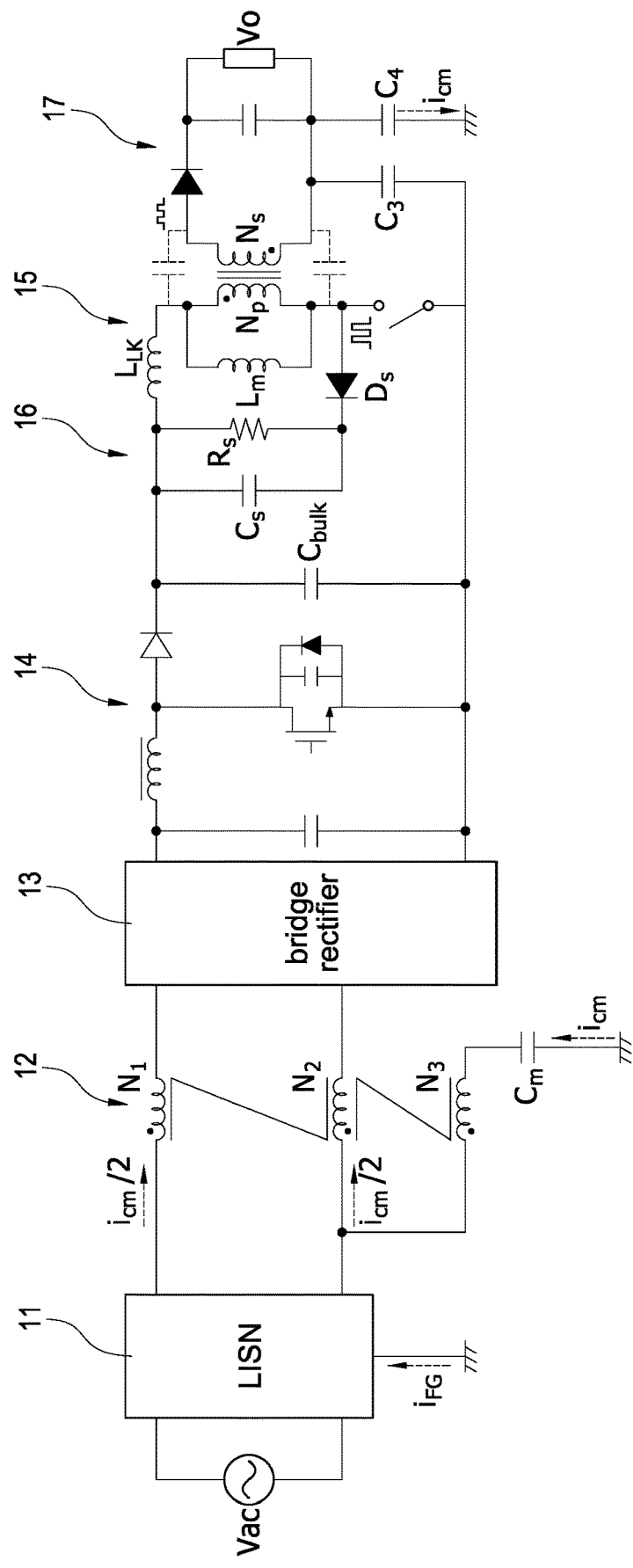
FIG. 2 is a circuit diagram of a common-mode noise cancellation circuit and a switching power converter with a passive common-mode noise cancellation function according to the present disclosure.

Please refer to FIG. 2, which shows a circuit diagram of a common-mode noise cancellation circuit and a switching power converter with a passive common-mode noise cancellation function according to the present disclosure. The switching power converter with the passive common-mode noise cancellation function (hereinafter referred to as switching power converter) includes a transformer 15, a primary-side circuit, and a secondary-side circuit. The transformer 15 includes a primary side and a secondary side. The primary-side circuit is coupled to the primary side, and the secondary-side circuit is coupled to the secondary side.

The primary-side circuit includes a line impedance stabilization network 11, a common-mode noise cancellation circuit 12, a bridge rectifier 13, and a voltage conversion circuit 14. Moreover, the primary-side circuit further includes a protection circuit 16. In particular, the bridge rectifier 13 is used to convert an AC power source into a DC power source, and therefore when the input power source is an AC power source, the bridge rectifier 13 needs to be used; otherwise, when the input power source is a DC power source, the bridge rectifier 13 may be omitted.

Hereinafter, the input power source is an AC power source Vac as an example for illustration, but this does not limit the present disclosure, which means that the input power source may also be a DC power source. The line impedance stabilization network (LISN) 11 receives the AC power source Vac. In particular, all electronic devices have to undergo EMI conduction testing before they can be sold. In EMI conduction testing, the output noise from the telecommunication port will interfere with call quality and network transmission rate. Therefore, most telecommunication devices require ISN testing to evaluate the interference on the telecommunication port, in addition to conducting tests on the power supply section. In testing, LISN and ISN are commonly used. The power side testing is usually referred to as LISN testing, and the output port testing is usually referred to as ISN testing. In particular, LISN is used in EMI conduction testing to isolate the power source from the device under test and couple the interference signals from the device under test to the EMC analyzer.

The common-mode noise cancellation circuit 12 includes a capacitor Cm and an inductor. The inductor is a three-coupled-winding inductor, that is, the inductor includes three coupled windings involving a first coupled winding $N_1$, a second coupled winding $N_2$, and a third coupled winding $N_3$. The notation $N_1$, $N_2$, $N_3$ can also represent the turns ratio of the three coupled windings, that is, the turns ratio between the first coupled winding $N_1$, the second coupled winding $N_2$, and the third coupled winding $N_3$ is $N_1:N_2:N_3$. An input end of the first coupled winding $N_1$ and an input end of the second coupled winding $N_2$ are respectively coupled to two output ends (or two output paths) of the LISN 11.

In this embodiment, an input end of the third coupled winding $N_3$ is coupled to the input end of the second coupled winding $N_2$, and an output end of the third coupled winding $N_3$ is coupled to a first end of the capacitor Cm. A second end of the capacitor Cm is coupled to a ground, i.e., the second end of the capacitor Cm is grounded.

Moreover, in this embodiment, a polarity of the input end of the first coupled winding $N_1$ is the same as a polarity of the input end of the second coupled winding $N_2$ and is the same as a polarity of the input end of the third coupled winding $N_3$.

Two input ends of the bridge rectifier 13 are respectively coupled to the output end of the first coupled winding $N_1$ and the output end of the second coupled winding $N_2$. In this embodiment, the bridge rectifier 13 is an active bridge rectifier (composed of active switch arms) or a passive bridge rectifier (composed of diode arms).

The voltage conversion circuit 14 is coupled between the bridge rectifier 13 and the primary side of the transformer 15. In this embodiment, the voltage conversion circuit 14 is a boost circuit, a buck circuit, or a buck-boost circuit. As mentioned above, if the bridge rectifier 13 is not required, the voltage conversion circuit 14 is coupled between the output end of the first coupled winding $N_1$, the output end of the second coupled winding $N_2$, and the primary side.

The protection circuit 16 is coupled to the primary side of the transformer 15. In this embodiment, the protection circuit 16 is a clamping circuit, such as an RCD clamping circuit, or the protection circuit 16 is a snubber circuit, such as an RCD snubber. However, the protection circuit 16 of the present disclosure is not limited to the previous disclosed embodiments, and any circuit capable of protecting the primary side of transformer 15 may be used as the protection circuit 16 in the present disclosure. The secondary-side circuit includes an output rectifier 17, and the output rectifier 17 is coupled to a load.

Therefore, compared to the related-art switching power converter shown in FIG. 1, only one additional inductor winding is required. Specifically, the converter is modified from having two coupled windings to three coupled windings, and one of the Y capacitors (either capacitor C1 or capacitor C2) can be removed. The feature of the present disclosure is to use the three-coupled-winding inductor having three coupled windings $N_1$, $N_2$, $N_3$, and the third coupled winding $N_3$ provides a reverse current equivalent to a magnitude of a common-mode noise current (i.e., a reverse common-mode noise current $i_{cm}$). A current path of the newly added reverse common-mode noise current $i_{cm}$ can replace the total current of the first coupled winding $N_1$ and the second coupled winding $N_2$, i.e., $i_{cm}/2+i_{cm}/2$. Due to the shorter path and lower impedance of the newly added reverse common-mode noise current $i_{cm}$ through the third coupled winding $N_3$, and the longer path and higher impedance of the ground path FG of the LISN 11, the reverse common-mode noise current $i_{cm}$ no longer passes through the LISN 11. In other words, the LISN 11 will not detect the current noise of the reverse common-mode noise current $i_{cm}$.

Figure 3:
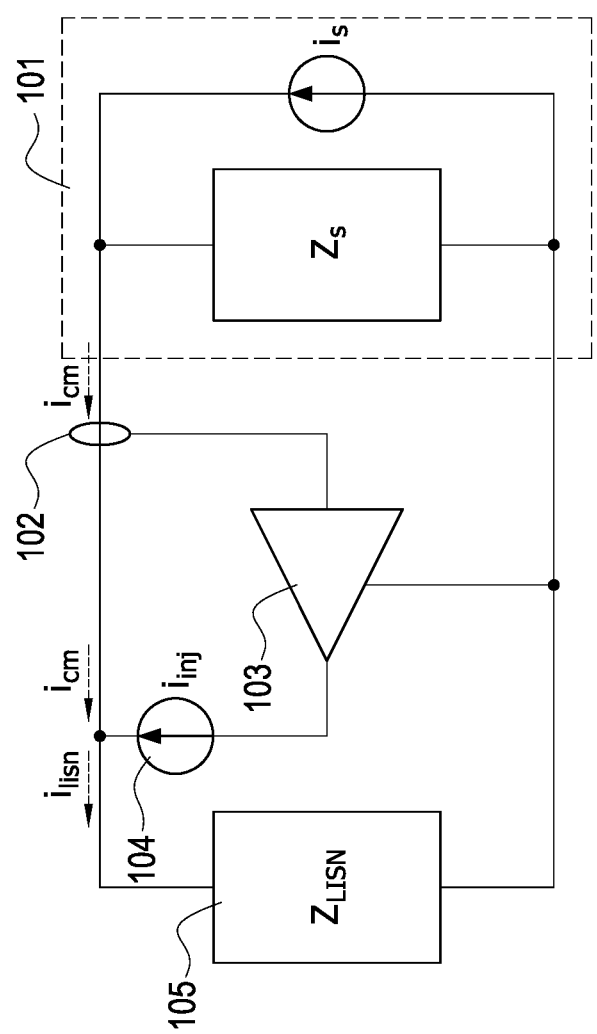
FIG. 3 is a schematic diagram of cancelling a common-mode current by the common-mode noise cancellation circuit according to the present disclosure.

Please refer to FIG. 3, which shows a schematic diagram of cancelling a common-mode current by the common-mode noise cancellation circuit according to the present disclosure. The reverse common-mode noise current $i_{cm}$ (flowing through a current sensor 102) generated from a common-mode noise source 101 completely flows through the capacitor Cm (as an injecting stage of a capacitive coupler) of the common-mode noise cancellation circuit 12, i.e., flows through an injecting current source 104. Therefore, as shown in FIG. 3, a gain of a gain unit 103 is −1 so as to express the complete flow of reverse common-mode noise current $i_{cm}$ into the common-mode noise cancellation circuit 12. In other words, the common-mode noise current $i_{cm}$ no longer flows through the LISN 11, which means that due to the higher LISN impedance 105, a current ilisn flowing through the LISN 11 is zero. Therefore, the LISN 11 will not detect the current noise of the reverse common-mode noise current $i_{cm}$. Accordingly, by adding the third coupled winding $N_3$ to a common-mode inductor of a low-pass filter, a reverse common-mode current is generated to cancel the reverse common-mode noise current $i_{cm}$.

Moreover, in the switching power converter with a passive common-mode noise cancellation function, the common-mode noise cancellation circuit 12 simultaneously functions as a wideband current transformer (CT), a signal amplifier, and a signal inverter, thereby possessing multiple functionalities. In particular, the capacitor Cm uses as the injecting stage of the capacitive coupler. Therefore, compared to the traditional active EMI filter (AEF) topology consisting of operational amplifiers or semiconductor components, which requires external power supply and also raises concerns about generating EMI, the common-mode noise cancellation circuit and the switching power converter with the passive common-mode noise cancellation function of the present disclosure are entirely composed of passive components such as inductors and capacitors, which are lossless. Therefore, it does not generate any additional loss and it has advantages of cost and system reliability.

In summary, the present disclosure has the following features and advantages:
1. A structure of the common-mode noise cancellation circuit composed entirely of passive components, as evident from experimental results, clearly shows that the same components, when using common-mode noise cancellation techniques, can achieve better common-mode noise cancellation performance.
2. Compared to the traditional passive LC filters under the same number of components, the present disclosure only requires the addition of the third coupled winding. However, since the third coupled winding carries a smaller current, it can be made using finer enameled wire without significantly increasing the size and cost of the coupled inductor.
3. Using a small-size common-mode choke (CM choke) achieves higher filtering performance, and the reduced number of windings and compact size of the CM choke contribute to efficient and compact design.
4. Addition of the third coupled winding using parallel winding method with the existing windings, and the third coupled winding has a smaller wire diameter (lower current), which does not significantly increase the cost.
5. Reliability is higher in designs that are fully composed of passive components.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A common-mode noise cancellation circuit applied to a switching power converter comprising a transformer, comprising:
   a capacitor, only coupled to a primary side of the transformer, not between the primary side and a secondary side of the transformer, and one end of the capacitor being grounded, and
   an inductor, comprising three coupled windings involving a first coupled winding, a second coupled winding, and a third coupled winding,
   wherein an input end of the first coupled winding and an input end of the second coupled winding are respectively coupled to two ends of an input power source; an input end of the third coupled winding is coupled to the input end of the second coupled winding, and an output end of the third coupled winding is coupled to the other end of the capacitor,
   wherein an output end of the first coupled winding and an output end of the second coupled winding are respectively coupled to two input ends of a power conversion stage.

2. The common-mode noise cancellation circuit as claimed in claim 1, wherein a polarity of the input end of the first coupled winding is the same as a polarity of the input end of the second coupled winding and is the same as a polarity of the input end of the third coupled winding.

3. The common-mode noise cancellation circuit as claimed in claim 1, wherein the third coupled winding generates a reverse current equivalent to a magnitude of a common-mode noise current.

4. The common-mode noise cancellation circuit as claimed in claim 1, wherein the common-mode noise cancellation circuit has a function of a current transformer.

5. The common-mode noise cancellation circuit as claimed in claim 4, wherein the common-mode noise cancellation circuit further has a function of a signal amplifier and/or a function of a signal inverter.

6. A switching power converter with a passive common-mode noise cancellation function, comprising:
  a transformer, comprising a primary side and a secondary side,
  a primary-side circuit, coupled to the primary side, and the primary-side circuit comprising:
    a line impedance stabilization network, configured to receive an input power source,
    a common-mode noise cancellation circuit, comprising:
    a capacitor, only coupled to the primary side of the transformer, not between the primary side and the secondary side of the transformer, and one end of the capacitor being grounded, and
    an inductor, comprising three coupled windings including a first coupled winding, a second coupled winding, and a third coupled winding, wherein an input end of the first coupled winding and an input end of the second coupled winding are respectively coupled to two output ends of the line impedance stabilization network; an input end of the third coupled winding is coupled to the input end of the second coupled winding, and an output end of the third coupled winding is coupled to the other end of the capacitor,
  a voltage conversion circuit, coupled between an output end of the first coupled winding, an output end of the second coupled winding and the primary side.

7. The switching power converter as claimed in claim 6, wherein based on the input power source being an AC power source, the switching power converter further comprises:
  a bridge rectifier, coupled between the common-mode noise cancellation circuit and the voltage conversion circuit, and two input ends of the bridge rectifier are respectively coupled to the output end of the first coupled winding and the output end of the second coupled winding.

8. The switching power converter as claimed in claim 7, wherein the bridge rectifier is an active bridge rectifier or a passive bridge rectifier.

9. The switching power converter as claimed in claim 6, wherein a polarity of the input end of the first coupled winding is the same as a polarity of the input end of the second coupled winding and is the same as a polarity of the input end of the third coupled winding.

10. The switching power converter as claimed in claim 6, wherein the third coupled winding generates a reverse current equivalent to a magnitude of a common-mode noise current.

11. The switching power converter as claimed in claim 6, wherein the common-mode noise cancellation circuit has a function of a current transformer.

12. The switching power converter as claimed in claim 11, wherein the common-mode noise cancellation circuit further has a function of a signal amplifier and/or a function of a signal inverter.

13. The switching power converter as claimed in claim 6, wherein the primary-side circuit further comprises:
  a protection circuit, coupled to the primary side of the transformer.

14. The switching power converter as claimed in claim 13, wherein the protection circuit is a clamping circuit or a snubber circuit.

15. The switching power converter as claimed in claim 6, wherein the voltage conversion circuit is a boost circuit, a buck circuit, or a buck-boost circuit.

* * * * *